(No Model.)
W. VREELAND.
WEED EXTERMINATOR.
No. 480,300. Patented Aug. 9, 1892.
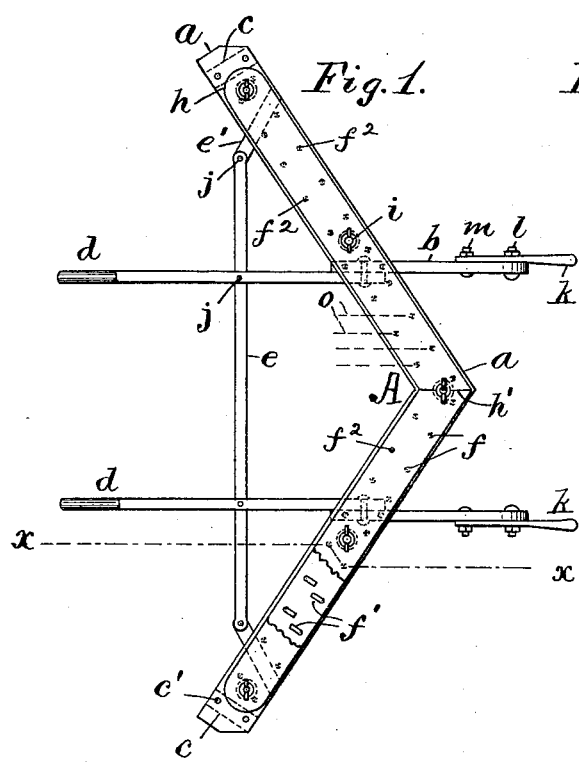
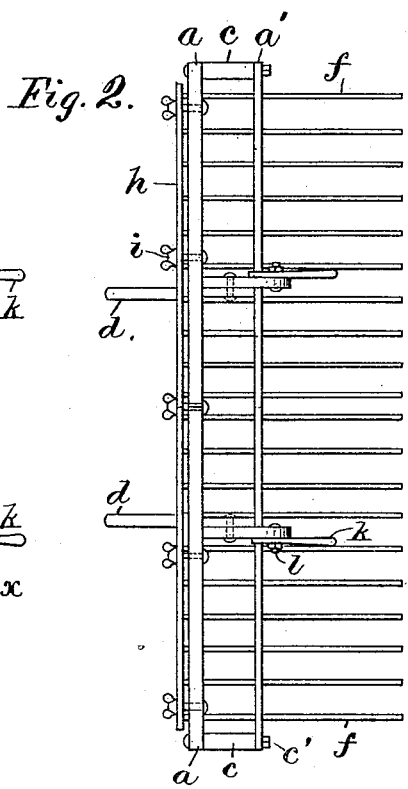
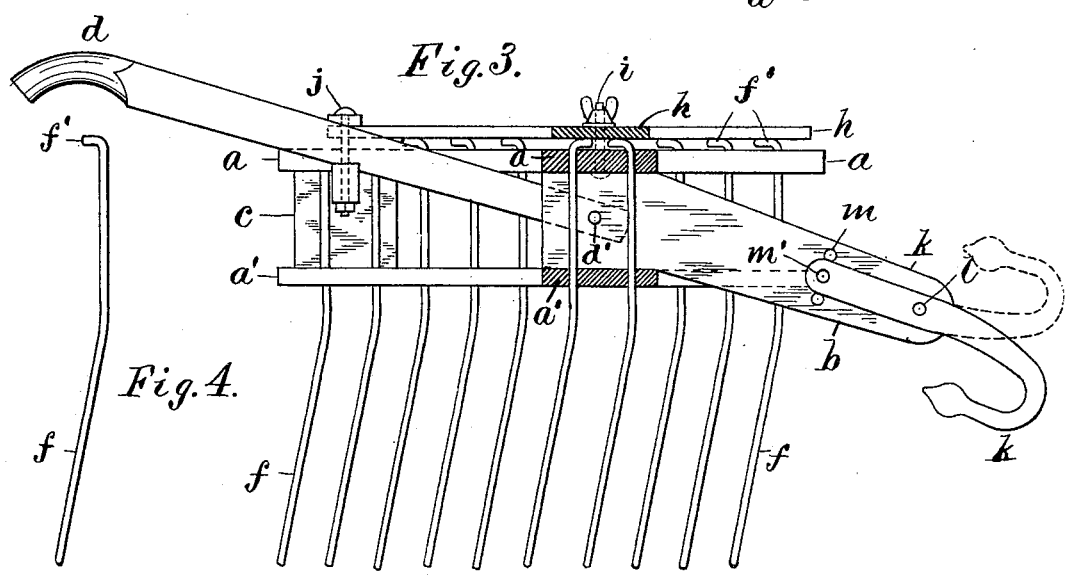
Attest:
L. Lee.
Edw. F. Kinsey.
Inventor.
Warren Vreeland, per
Crane & Miller, Attys.

UNITED STATES PATENT OFFICE.

WARREN VREELAND, OF NUTLEY, NEW JERSEY.

WEED-EXTERMINATOR.

SPECIFICATION forming part of Letters Patent No. 480,300, dated August 9, 1892.

Application filed April 6, 1892. Serial No. 428,025. (No model.)

*To all whom it may concern:*

Be it known that I, WARREN VREELAND, a citizen of the United States, residing at Nutley, Essex county, New Jersey, have invented certain new and useful Improvements in Automatic Weed-Exterminators, fully described and represented in the following specification and the accompanying drawings, forming a part of the same.

The object of this invention is to furnish a cultivator with long, flexible, and pivoted teeth adapted to scrape the soil when the weeds are young and tender and to turn in their sockets when encountering the cultivated plants, so as to not injure the latter. My apparatus is thus adapted to exterminate weeds growing around young corn and other vegetables.

My invention furnishes a cheap and effective construction to support the movable teeth in a frame provided with handles and with hooks to which the traces of the horses can be directly attached.

The construction also furnishes means for removing any of the teeth from the frame at pleasure, so as to leave a gap in the implement to clear the plants when growing in regular rows.

In the drawings, Figure 1 is a plan of the implement; Fig. 2, a front view of the same with the rear row of teeth omitted to avoid confusing the drawing. Fig. 3 is a cross-section on line $x\ x$ in Fig. 1, including the parts in the rear of the section-plane. Figs. 1 and 2 are drawn upon one-half the scale of Fig. 3. Fig. 4 is a view of one tooth detached from the frame.

The frame consists in two plates $a$ and $a'$, framed with an angle A at the middle and secured upon the upper and lower sides, respectively, of the draft-bars $b$ and the spacing-blocks $c$. The spacing-blocks are clamped between the outer ends of the plates by bolts $c'$. Handles $d$ are attached to the bars $b$ by bolts $d'$ and are also secured by bolts $j$ to a brace $e$, which is extended across the rear side of the frame and attached thereto by straps $e'$. These parts when bolted together, as shown, form a very light but rigid frame having a depth of about eight inches to hold the teeth firmly and yet movably. The teeth are made very long and flexible, so as to readily yield when resisted, and formed with a right-angle bend or head $f'$ at the top and are curved or bent backwardly in the lower half of their length. At the section of the plates $a$ and $a'$ in Fig. 3 two of the teeth are shown inserted through holes in the plates and having their heads or bent ends $f'$ covered by a cap-plate $h$. This plate is secured movably above the plate $a$ by means of bolts $i$, having thumb-nuts, which can be readily unscrewed.

The holes for the teeth are indicated by dotted circles $f^2$ in Fig. 1, and a portion of the cap $h$ is broken away in the lower part of such figure, showing the heads $f'$ upon four of the teeth. Such heads form very convenient handles by which the teeth may be drawn upward to remove them from the plates $a\ a'$ whenever it is desired to form a gap among the teeth in a certain part of the implement to clear the rows of growing plants.

The plate $h$ is clamped upon washers $o$, which hold it at a suitable distance above the plate $a$ for the heads of the teeth to turn freely, thus permitting the teeth to rotate in the frame when required and thus allowing the curved lower ends of the teeth to swing laterally with perfect freedom when they strike any obstacle.

The cap $h$ is formed in two parts, with a division at the middle line $h'$, and either half may be removed separately by removing the nuts upon the bolts $i$, thus permitting any of the teeth in one-half of the frame to be drawn upward and removed. Two rows of holes $f^2$ are shown in Fig. 1, and the holes are so formed that the paths of the teeth in the two rows are alternated, as indicated by the dotted lines $o$. Only the front row of the teeth is shown in Fig. 2 to avoid confusing the drawing, and only a single row of the teeth is shown in Fig. 3 for the same reason.

The draft-bars $b$ are provided with hooks $k$, having reversible shanks $k'$, by which the hook may be turned downward or may be turned upward, as shown in dotted lines in Fig. 3. The shank is pivoted to the end of the draft-bar by a bolt $l$, and several holes $m$ are made in the draft-bar at the end of the shank to fit the bolt $m'$, by which means the hook may be adjusted upward or downward to alter the line of draft. By this simple expedient the point of the frame to which the letter A is applied in Fig. 1 may be thrown downward or upward, as may be required when operating upon level ground or weeding between the rows of vegetables. By attaching the horse's traces directly to the hooks without the intervention of a whiffletree the horse is enabled to turn the implement more quickly and to work more closely to the corners of the field where it is used.

The construction described is very cheap and forms a light and effective implement for exterminating young weeds. The right-angle bend $f'$ upon the top of each tooth is a much cheaper construction than a head formed by upsetting or welding and is entirely effective in holding the teeth from upward or downward movement, while they also form the most convenient handles for grasping them when it is desired to draw them out of the frame.

Having thus set forth the nature of my invention, what I claim herein is—

1. The combination, with the draft-bars $b$ and spacing-blocks $c$, of the plates $a$ and $a'$, secured, respectively, above and below the draft-bars and blocks, the handles $d$, the brace $e$, and the teeth inserted through the plates $a$ and $a'$, substantially as herein set forth.

2. The combination, with the draft-bars $b$ and spacing-blocks $c$, of the plates $a$ and $a'$, secured, respectively, above and below the draft-bars and blocks, the handles $d$, the brace $e$, and the teeth bent backwardly and provided with the heads $f'$ and fitted removably in the plates $a$ and $a'$, with a cap held over the heads of the teeth to permit their rotations in the plates, as and for the purpose set forth.

3. The combination, with the draft-bars $b$ and spacing-blocks $c$, of the plates $a$ and $a'$, secured, respectively, above and below the draft-bars and blocks, the handles $d$, the brace $e$, the teeth bent backwardly and provided with the heads $f'$ and fitted removably in the plates $a$ and $a'$, and the cap secured detachably over the heads of the teeth to permit the removal of the latter.

4. The combination, with the draft-bars $b$ and spacing-blocks $c$, of the plates $a$ and $a'$, secured, respectively, above and below the draft-bars and blocks, the handles $d$, the brace $e$, the teeth inserted through the plates $a$ and $a'$, and the hooks $k$, provided with reversible shanks and secured adjustably to the draft-bars, as and for the purpose set forth.

In testimony whereof I have hereunto set my hand in the presence of two subscribing witnesses.

WARREN VREELAND.

Witnesses:
THOMAS S. CRANE,
L. LEE.